July 4, 1961

H. J. KOZICKI 2,991,088

LOAD LEVELING MOTOR VEHICLE WHEEL SUSPENSION

Filed Oct. 12, 1959

HENRY J. KOZICKI
INVENTOR.

BY *John R. Faulkner*
*Thomas H. Oster*

ATTORNEYS

July 4, 1961  H. J. KOZICKI  2,991,088
LOAD LEVELING MOTOR VEHICLE WHEEL SUSPENSION
Filed Oct. 12, 1959  2 Sheets-Sheet 2

HENRY J. KOZICKI
INVENTOR.

BY John R. Faulkner
Thomas H. Oster

ATTORNEYS

United States Patent Office 2,991,088
Patented July 4, 1961

2,991,088
LOAD LEVELING MOTOR VEHICLE WHEEL SUSPENSION
Henry J. Kozicki, Livonia, Mich., assignor to Ford Motor Company, Dearborn, Mich., a corporation of Delaware
Filed Oct. 12, 1959, Ser. No. 845,928
9 Claims. (Cl. 280—124)

This invention relates generally to motor vehicle wheel suspensions and particularly to motor vehicle wheel suspensions of the torsion spring type.

The present invention is particularly adapted for use in conjunction with a motor vehicle wheel suspension having primary load supporting spring means and comprises torsion spring means supplementing the primary spring means and so arranged as to enable adjustments to be made in the riding height of the vehicle to compensate for load changes. The present construction utilizes a pair of torsion springs, one of which extends transversely across the vehicle frame and the other of which is generally U-shaped and which is located primarily at one side of the vehicle frame. Each spring has one end connected to an unsprung portion of the vehicle and the opposite ends of the two springs are located adjacent each other and are anchored to an actuating member pivotally mounted upon the vehicle frame at one side. Suitable power means and automatic control means may be utilized to adjust the actuating member to vary the torsional loading of the torsion springs and vary the height of the vehicle as necessary to compensate for load changes. An advantage of the construction resides in the fact that relatively long torsion springs may be utilized to provide the necessary capacity for the vehicle load and also to provide the low wheel rates required to maintain the desired soft ride characteristics obtained with the primary load supporting springs.

Other objects and advantages of this invention will be made more apparent as this description proceeds, particularly when considered in connection with the accompanying drawings, wherein.

Figure 3:
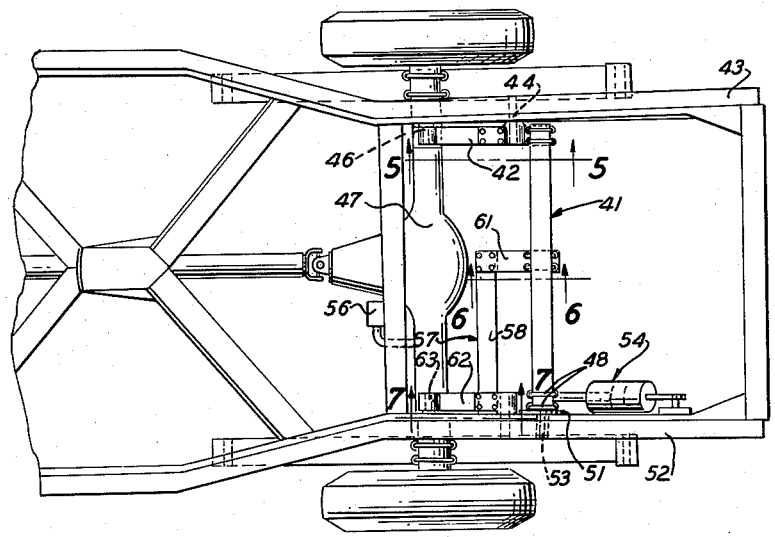
FIGURE 3 is a plan view of a modification.
Figure 5:
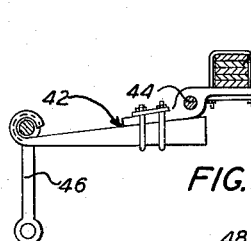
Figure 6:
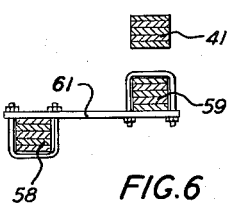
Figure 7:
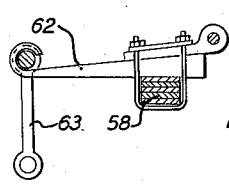

FIGURES 5, 6 and 7 are cross sectional views on the lines 5—5, 6—6 and 7—7 of FIGURE 3.

Figure 4:
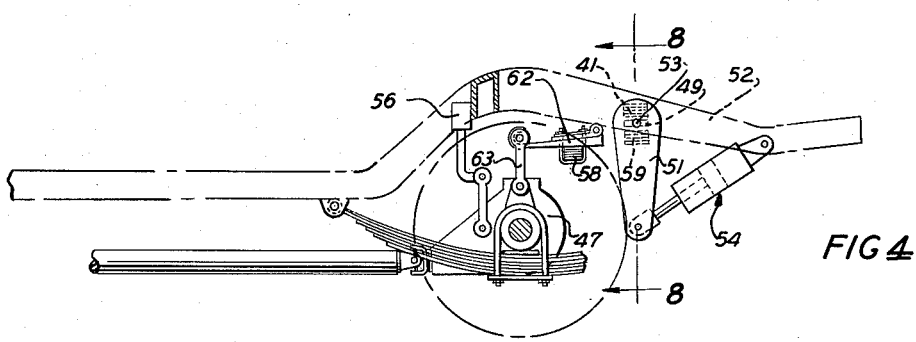
FIGURE 4 is a side elevational view of the modification.
Figure 8:
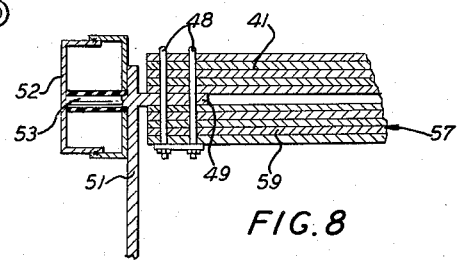

FIGURE 8 is a cross sectional view on the line 8—8 of FIGURE 4.

Figure 1:
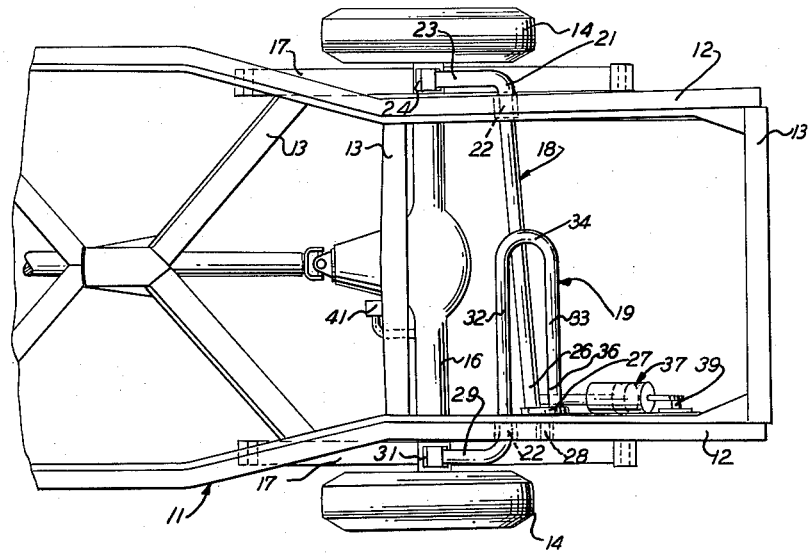
FIGURE 1 is a plan view of a portion of a motor vehicle chassis incorporating the present invention.
Figure 2:
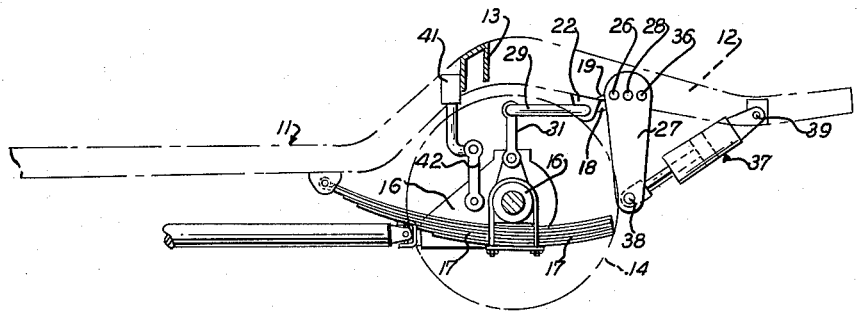
FIGURE 2 is a side elevational view of the construction shown in FIGURE 1.

Referring now to the drawings, and particularly to FIGURES 1 and 2, reference character 11 indicates a motor vehicle frame having side frame rails 12 and cross frame members 13. Rear road wheels 14 are supported at opposite ends of an axle housing 16 and the latter is conventionally connected to the vehicle frame by means of leaf springs 17. The leaf springs 17 form the primary load supporting and spring means for the rear wheel suspension of the vehicle.

A pair of torsion springs 18 and 19 are provided to supplement the leaf springs 17 and to provide means for adjusting the riding height of the vehicle to compensate for changes in the load carried by the vehicle or to change the normal riding height of the vehicle if desired.

Torsion spring 18 is in the form of a cylindrical bar extending completely across the vehicle frame between the side rails 12. The end 21 of the bar extends beneath the adjacent frame rail 12 and is journaled in a bracket 22 depending therefrom. This end of the bar is formed with a lever arm 23 connected by means of a link 24 to the axle housing 16 adjacent one of the rear road wheels 14. If desired, a separate lever can be used in place of the integral portion 23 of the torsion spring since this portion of the spring functions only as a crank arm or lever.

The opposite end 26 of the torsion spring 18 terminates adjacent the opposite side frame rail 12 of the vehicle frame and is welded or otherwise suitably anchored to a vertically extending lever 27. Lever 27 carries a pivot extension 28 journaled in the frame rail 12 to enable the lever 27 to rotate about a horizontal transversely extending axis. It will be noted that the end 26 of the torsion spring 18 is offset radially with respect to the pivot axis 28 of the lever 27.

The second torsion spring 19 is also in the form of a cylindrical bar and has a similar end portion 21 journaled in a bracket depending from the frame rail 12 at the opposite side of the vehicle. This end of the torsion spring 19 is formed with a lever arm portion 29 connected by means of a link 31 to the axle housing 16 adjacent the road wheel 14 at that side of the vehicle.

The body portion of the torsion spring 19 is generally U-shaped as viewed in plan with its two leg portions 32 and 33 extending transversely of the vehicle generally parallel to each other. The intermediate bight portion 34 is located generally at the longitudinal centerline of the vehicle. The end 36 of the leg 33 of the torsion spring 19 terminates adjacent the corresponding end 26 of the torsion spring 18 and is welded or otherwise suitably anchored to the lever 27 at a point spaced radially from the pivotal axis 28 of the lever and on the opposite side thereof from the end 26 of the spring 18.

It will be apparent that the lever 27 forms an actuating member, which when rotated about its pivotal axis 28 varies the torsional load of the torsion springs 18 and 19. This in turn is effective to raise or lower the vehicle frame relative to the vehicle wheels. In the present instance the actuating lever 27 is rotated by means of a conventional piston and cylinder unit 37 having one end 38 connected to the lower portion of the lever 27 and its opposite end 39 pivotally connected to the side frame rail 12. The piston and cylinder unit may be hydraulically powered from a suitable fluid pressure source and controlled by means of a sensing valve 41 mounted upon a vehicle frame cross member 13 and connected by means of a link 42 to the axle housing 16.

When the load upon the vehicle is changed by reason of ingress or egress of passengers, or by a change in the luggage carried, the distance between the sprung and unsprung portions of the vehicle or, in other words, between the vehicle frame and body on the one hand and the road wheels and axle housing on the other hand, is varied. This variation is detected by the sensing valve 41, which in turn actuates the hydraulic piston and cylinder unit 37 to rotate the actuating lever 27 in the appropriate direction to increase or decrease the torsional loading on the torsion springs 18 and 19 and to thus compensate for the change in vehicle loading, returning the vehicle to its normal riding height.

The use of a straight torsion spring extending completely across the frame, in combination with a U-shaped torsion spring, enables both springs to be actuated from one side of the vehicle by one actuating mechanism, thus simplifying the construction. It also enables relatively long torsion springs to be used so that the torsion springs may adjust the vehicle riding height without overloading the springs. The long torsion springs are also advantageous in that they do not materially affect the desired soft ride characteristics of the vehicle. While supplementing the main load carrying leaf springs, the torsion springs thus have a minimum effect upon the ride yet perform their function of compensating for load changes.

The modification shown in FIGURES 3 to 8 inclusive is similar in function to that shown in FIGURES 1 and 2 but employs laminated leaf springs as the torsional springs rather than the cylindrical torsion bars of the modification shown in FIGURES 1 and 2.

In the modified form of the invention, a multiple leaf laminated torsion spring 41 extends transversely across the vehicle frame. One end of the spring is secured to a two-piece lever arm 42 pivotally mounted upon the side frame rail 43 for pivotal movement about an axis 44. The forward end of the arm 42 is connected by a link 46 to the axle housing 47.

The opposite end of the laminated torsion spring 41 is connected by U bolts 48 to a transverse flange 49 of an actuating lever 51. The actuating lever 51 is supported upon the side frame rail 52 for pivotal movement about a transverse horizontal axis 53. As in the first modification, the angular adjustment of the lever 51 is accomplished by a piston and cylinder unit 54 under the control of a sensing unit 56. If desired, of course, the actuating lever 51 could be arranged to be manually controlled and/or manually powered.

The second torsion spring 57 of the modified form of the invention is generally U-shaped and comprises two parallel laminated torsion springs 58 and 59 extending generally parallel to each other, with the spring 59 being positioned beneath the long torsion spring 41 and with the spring 58 being spaced forwardly therefrom. The two springs 58 and 59 terminate adjacent the longitudinal centerline of the vehicle and are interconnected by a connecting bar 61. The radially outer end of the laminated torsion spring 58 is connected by means of a two-piece lever arm 62 to a link 63 in turn connected to the axle housing 47. The corresponding end of the rearward laminated torsion spring 59 is connected to the flange 49 of the actuating lever 51 by means of the U-bolts 48 (FIGURE 8).

From the foregoing it will be seen that the single long torsion spring 41 is connected to the actuating lever 51 above its pivotal axis 53, while the adjacent end of the U-shaped torsion spring assembly 57 (spring 59) is connected to the actuating lever 51 beneath its pivotal axis 53. Rotary adjustment of the actuating lever 51 thus changes the torsional loading of the torsion springs to raise or lower the vehicle height to compensate for load changes or to change the riding height of the vehicle in a fashion similar to that of the modification shown in FIGURES 1 and 2.

It will be understood that the invention is not to be limited to the exact construction shown and described, but that various changes and modifications may be made without departing from the spirit and scope of the invention as defined in the appended claims.

I claim:

1. In a motor vehicle having road wheels and sprung and unsprung members resiliently interconnected by load supporting spring means, a torsion element having one end connected to an unsprung member adjacent a road wheel on one side of the vehicle and extending transversely of said vehicle to the opposite side thereof, a second torsion element having one end connected to an unsprung member adjacent a road wheel at said opposite side of said vehicle, said second torsion element extending transversely of said vehicle and being of generally U-shape with its other end located adjacent the other end of said first torsion element at said opposite side of said vehicle, and an actuating member engaging the said other ends of said first and second torsion elements to torsionally adjust said elements to vary the height of said vehicle.

2. The structure defined by claim 1 which is further characterized in that said actuating member comprising a lever pivotally mounted upon a sprung member of said vehicle, the other ends of said first and second torsion elements being anchored to said member at points spaced from each other and from the pivotal axis of said lever, and means for rotating said lever about its axis to torsionally adjust said elements.

3. The structure defined by claim 1 which is further characterized in that said first torsion element comprises a generally straight torsion bar extending transversely of said vehicle from one side thereof to the opposite side, and said second torsion element comprises a U-shaped torsion bar having its ends positioned adjacent one side of the vehicle and its intermediate bight portion positioned adjacent the longitudinal centerline of the vehicle.

4. The structure defined by claim 1 which is further characterized in that said first torsion element comprises a multiple leaf laminated torsion spring extending transversely of the vehicle from one side thereof to the opposite side and said second torsion element comprises a pair of longitudinally spaced laterally extending multiple leaf laminated torsion springs extending from adjacent one side of the vehicle to approximately the transverse central portion thereof, and means interconnecting the adjacent ends of said second mentioned torsion springs adjacent the transverse central portion of the vehicle.

5. In a motor vehicle, in combination, a frame having longitudinally extending side frame rails, a road wheel at each side of said vehicle, wheel supporting members for said road wheels, load supporting spring means supporting said vehicle frame upon said wheel supporting members, a transversely extending torsion spring having one end journaled upon one of said side frame rails and its opposite end located adjacent the side frame rail at the opposite side of the vehicle, a second torsion spring of generally U-shape having one end journaled on the side frame rail at said opposite side of the vehicle and its other end positioned adjacent the other end of said first torsion spring, means connecting the frame mounted ends of said first and second torsion springs to said wheel supporting members, and movable means supported upon said vehicle frame and engaging the said other ends of said first and second torsion springs to torsionally adjust the latter to vary the height of said vehicle frame relative to said road wheels.

6. The structure defined by claim 5 which is further characterized in that said movable means comprises a member pivotally mounted upon the side frame rail at the said opposite side of said vehicle, the said other ends of said first and second torsion springs being anchored to said member at points spaced from the pivotal mounting of said member of said side frame rail, and power means for angularly adjusting said member to vary the torsional loading of said torsion springs.

7. The structure defined by claim 6 which is further characterized in that the other ends of said first and second torsion springs are anchored to said adjustable member on opposite sides of the pivotal connection of said adjustable member to said side frame rail.

8. In a motor vehicle having road wheels and sprung and unsprung members resiliently connected by main load supporting spring means, a load leveling device comprising a pair of auxiliary spring means each connected at one end to an unsprung member adjacent road wheels on opposite sides of the vehicle, the other ends of said pair of auxiliary spring means terminating adjacent one side of said vehicle, and means for adjustably anchoring said other ends of said spring means.

9. In a motor vehicle having road wheels and sprung and unsprung members resiliently interconnected by load supporting spring means, a load leveling device comprising a transversely extending torsion bar extending from one side of said vehicle to the opposite side thereof and having one end connected to an unsprung member adjacent one of said road wheels, a second torsion bar of generally U-shape having one end connected to an unsprung member adjacent a road wheel at the opposite side of said vehicle, said second torsion bar extending transversely and located substantially entirely at one side of the longitudinal centerline of the vehicle, and actuating means engaging the other ends of said first and second torsion bars adjacent one side of said vehicle to torsionally adjust said first and second torsion bars simultaneously to vary the height of both sides of said vehicle.

References Cited in the file of this patent

UNITED STATES PATENTS 2,227,762     Ronning _____ Jan. 7, 1941